United States Patent
Lam

(10) Patent No.: US 10,786,958 B2
(45) Date of Patent: Sep. 29, 2020

(54) BOTTLE CAP AND ITS USAGE METHOD

(71) Applicant: TOP ALLIANCE TECHNOLOGY LIMITED, Tortola (VG)

(72) Inventor: Koon Fung Lam, Hong Kong (CN)

(73) Assignee: TOP ALLIANCE TECHNOLOGY LIMITED, Tortola (VG)

( * ) Notice: Subject to any disclaimer, the term of this patent is extended or adjusted under 35 U.S.C. 154(b) by 255 days.

(21) Appl. No.: 15/767,640

(22) PCT Filed: Oct. 12, 2015

(86) PCT No.: PCT/CN2015/089340
§ 371 (c)(1),
(2) Date: Apr. 11, 2018

(87) PCT Pub. No.: WO2017/063105
PCT Pub. Date: Apr. 20, 2017

(65) Prior Publication Data
US 2018/0304565 A1    Oct. 25, 2018

(51) Int. Cl.
| | | |
|---|---|---|
| *B29C 73/16* | (2006.01) | |
| *B60C 25/00* | (2006.01) | |
| *B60S 5/04* | (2006.01) | |
| *B29L 30/00* | (2006.01) | |

(52) U.S. Cl.
CPC ............ *B29C 73/166* (2013.01); *B60C 25/16* (2013.01); *B60S 5/04* (2013.01); *B29L 2030/00* (2013.01)

(58) Field of Classification Search
CPC ............................. B29C 73/166; B29C 73/025
USPC ......................................................... 141/38
See application file for complete search history.

(56) References Cited

U.S. PATENT DOCUMENTS

| | | | |
|---|---|---|---|
| 8,640,745 B2 | 2/2014 | Ji | |
| 9,114,573 B2 * | 8/2015 | Wang | .................... B29C 73/166 |
| 9,308,893 B2 * | 4/2016 | Wang | .................... B29C 73/166 |
| 2014/0103006 A1 | 4/2014 | Hong | |
| 2015/0151594 A1 | 6/2015 | Hong | |

FOREIGN PATENT DOCUMENTS

| | | |
|---|---|---|
| CA | 2810034 A1 | 9/2014 |
| CN | 202965227 U | 6/2013 |

OTHER PUBLICATIONS

International Search Report, dated Jun. 7, 2016 for corresponding International Application No. PCT/CN2015/089340.
Written Opinion, dated Jun. 7, 2016 for corresponding International Application No. PCT/ CN2015/089340.

\* cited by examiner

*Primary Examiner* — Timothy P. Kelly
(74) *Attorney, Agent, or Firm* — Intellectual Property Law Group LLP

(57) ABSTRACT

A bottle cap comprising a case is provided; and an accommodating hole is axially formed in the case; an inlet pipe is arranged on an external side surface of the case; a limit flange is formed on an inner side surface of the accommodating hole, and the limit flange and an inner side surface of the accommodating hole above the limit flange cooperatively form a first recess; and the bottle cap further comprises a flow path switching element which is rotatably arranged in the first recess; a protruding body is arranged on the bottom of the limit flange, and a first through-hole is formed in the limit flange and the protruding body; and a plug is movably arranged in the first through-hole; The bottle cap of the present application has a simple structure and good practicability.

7 Claims, 2 Drawing Sheets

BOTTLE CAP AND ITS USAGE METHOD

TECHNICAL FIELD

The present application relates to a bottle cap used in a tire puncture emergency repair apparatus to feed tire puncture sealant and/or compressed air into a punctured tire so as to reduce and/or eliminate the puncture as an emergency measure, and in particular relates to a bottle cap providing a means to manually switch between flow paths of the compressed air toward a tire or a canister containing tire puncture sealant.

BACKGROUND ART

There are many different forms and designs of tire puncture repair apparatus accompanied with tire puncture sealant in a canister, which are known and currently available on the market. The tire puncture sealant is driven by compressed air from a compressor and introduced into a punctured tire to seal it as an emergency measure.

Besides, a valve in the compressor can be switched so that the compressed air can be directly pumped into the tire via a bypass to inflate the tire in succession without changing the hose connected to the tire. However, the valve is usually a built-in valve in the compressor. It implies that the valve works only with a kit of the compressor. Such apparatus is known, for example, from U.S. Pat. No. 8,251,105 B2, US 2014 0209207 A1 and US 2011 0011217 A1.

Some tire puncture repair apparatuses available on the market without such switching valves can achieve the same goal of injecting sealant and air into tire. However, they can be only used in a fixed pattern, where the tire puncture sealant and air are injected in succession. Particularly, the tire puncture sealant canister has to be emptied before inflating the tire, which is known, for example, from U.S. Pat. No. 8,997,801 B2, U.S. Pat. No. 6,964,284 B2, EP 1291158 B2, US 2013 0284313 A1 and US 2011 0192492 A1.

Technical Problem

The objective of the present application is to provide a bottle cap used in a tire puncture emergency repair apparatus to feed tire puncture sealant and/or compressed air into a punctured tire so as to reduce and/or eliminate the puncture as an emergency measure, aiming at the defect that some compressors in prior art adopts a built-in valve, so that the valve works only with a kit of the compressor, or a tire puncture sealant canister of some compressors in prior art has to be emptied before inflating the tire.

Solution to Problem

Technical Solution

The technical solutions of the present application for solving the technical problems are as follows.

In one aspect, a bottle cap comprising a case is provided; and an accommodating hole is axially formed in the case; an inlet pipe is arranged on an external side surface of the case; and a first inner hole of the inlet pipe communicates with the accommodating hole; a limit flange is formed on an inner side surface of the accommodating hole, and the limit flange and an inner side surface of the accommodating hole above the limit flange cooperatively form a first recess; and the limit flange and an inner side surface of the accommodating hole below the limit flange cooperatively form a second recess which is configured for fixing a bottle accommodating tire puncture sealant; and the bottle cap further comprises a flow path switching element which is rotatably arranged in the first recess; a protruding body is arranged on the bottom of the limit flange, and a first through-hole is formed in the limit flange and the protruding body; and a plug is movably arranged in the first through-hole; an outlet pipe is arranged on an external side surface of the case; and the outlet pipe communicates with the first through-hole; and a second through-hole is defined in the limit flange; an arc-shaped first flow path is defined in the flow path switching element, and the first flow path communicates with the first inner hole; and a second flow path is defined in the flow path switching element, and communicates with the first flow path; and the second flow path optionally communicates with the first through-hole or the second through-hole via rotation of the flow path switching element.

In one embodiment, a limit portion is mounted on the bottom of the protruding body, which is configured for restricting the plug to the first through-hole.

In another embodiment, the inlet pipe is integral with the case.

In another embodiment, the flow path switching element is supported on the top of the limit flange.

In another embodiment, a ring flange is formed on an external surface of the flow path switching element; and when the flow path switching element is arranged in the first recess, the ring flange is supported on the top of the case to seal a gap between the flow path switching element and the case.

In another embodiment, when the bottle accommodating tire puncture sealant is fixed in the second recess, the protruding body reaches the bottom of the bottle.

In another aspect, a usage method of a bottle cap comprises steps as follows, providing the bottle cap, and the bottle cap includes a flow path switching element;

the flow path switching element provides a switching means of flow paths between an inlet pipe and an outlet pipe, so that tire puncture sealant in a canister and compressed air are optionally fed to a punctured tire.

In another aspect, a usage method of a bottle cap comprises steps as follows, providing the bottle cap, and the bottle cap includes a flow path switching element; an arc-shaped first flow path is defined in the flow path switching element, and communicates with an inlet pipe; and a second flow path is defined in the flow path switching element, and communicates with the first flow path; and the second flow path optionally communicates with an outlet pipe directly or a bottle accommodating tire puncture sealant via rotation of the flow path switching element;

connecting the outlet pipe to a punctured tire; and rotating the flow path switching element to make the second flow path communicate with the bottle, and injecting compressed air from the inlet pipe into the outlet pipe, so that the tire puncture sealant and the compressed air are fed to the punctured tire; or rotating the flow path switching element to make the second flow path communicate with an outlet pipe directly, and injecting compressed air from the inlet pipe into the outlet pipe, so that only the compressed air is fed to the punctured tire.

Advantageous Effects of Invention

Advantageous Effects

When implementing the bottle cap of the present application, the following advantageous effects can be achieved: the bottle cap is designed to be compatible with most of conventional compressors. Even if the compressor has no switching valve inside or has only one compressed air outlet, the goal of facilitating manual switching between flow paths of the compressed air toward a tire directly or a bottle containing tire puncture sealant is achievable. The bottle cap of the present application has a simple structure and good practicability.

BRIEF DESCRIPTION OF DRAWINGS

Description of Drawings

Figure 1:
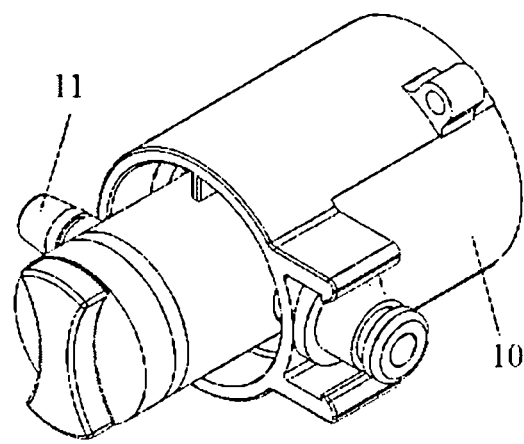
Figure 2:
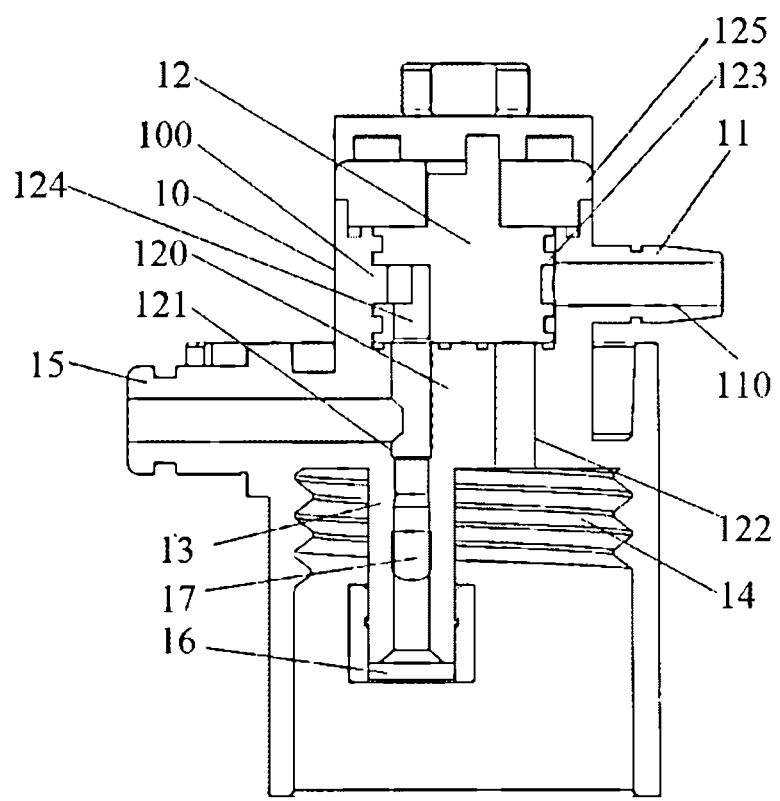
Figure 3:
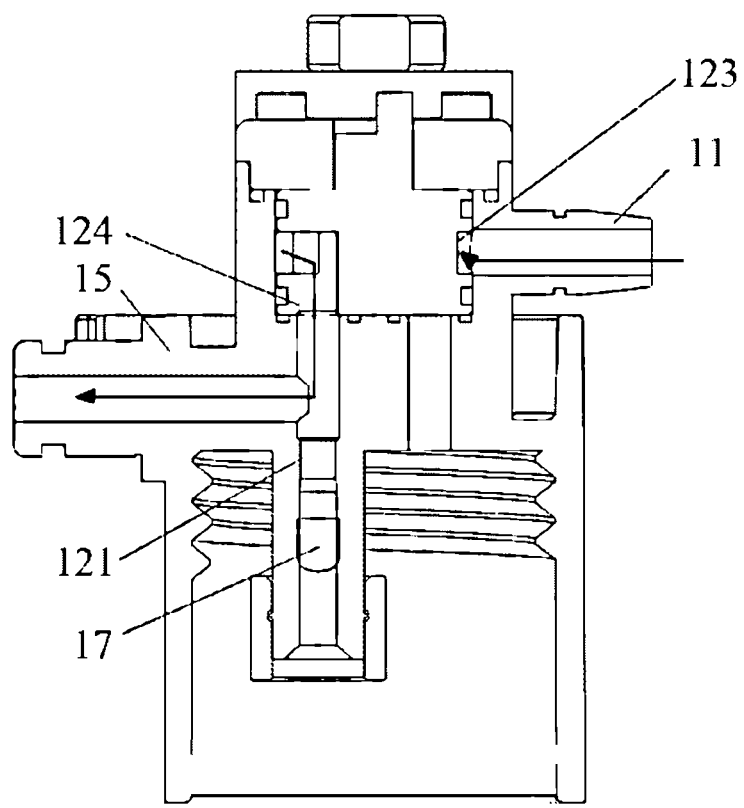
Figure 4:
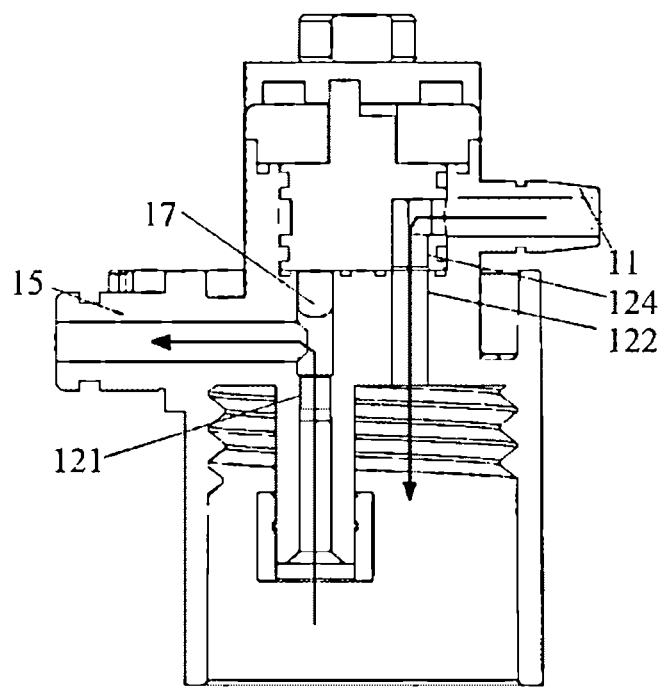

FIG. 1 is a perspective view of a bottle cap of an embodiment of the present application;

FIG. 2 is an axial sectional schematic view of the bottle cap shown in FIG. 1;

FIG. 3 is a schematic view of a tire inflation mode of the bottle cap shown in FIG. 1; and FIG. 4 is a schematic view of a sealant introduction mode of the bottle cap shown in FIG. 1.

MODE FOR THE INVENTION

Mode for Invention

The objective of the present application is to provide a bottle cap used in a tire puncture emergency repair apparatus to feed tire puncture sealant and/or compressed air into a punctured tire so as to reduce and/or eliminate the puncture as an emergency measure, aiming at the defect that some compressors in prior art adopts a built-in valve, so that the valve works only with a kit of the compressors, or a tire puncture sealant canister of some compressors in prior art has to be emptied before inflating the tire. The technical solution to solve the aforementioned defect is to provide a bottle cap with a flow path switching element which can leads tire puncture sealant and/or compressed air to a punctured tire.

To make the technical feature, objective and effect of the present application be understood more clearly, now the specific implementation of the present application is described in detail with reference to the accompanying drawings and embodiments.

As shown in FIGS. 1 and 2, FIG. 1 is a perspective view of a bottle cap of an embodiment of the present application; and FIG. 2 is an axial sectional schematic view of the bottle cap shown in FIG. 1.

In FIGS. 1 and 2, the bottle cap comprises a cylindrical case 10, and an accommodating hole 100 is axially formed in the case 10; an inlet pipe 11 is arranged on an external side surface of the case 10; and a first inner hole 110 of the inlet pipe 11 communicates with the accommodating hole 100. The inlet pipe 11 is configured for being connected to a compressor (not shown).

In the present embodiment, the inlet pipe 11 is integral with the case 10. In another embodiment, it can be understood that the inlet pipe 11 can be a separate part, and a bypass hole (not shown) is defined in an external side surface of the case 10, and communicates with the accommodating hole 100; and when the inlet pipe 11 is mounted on the case 10, the first inner hole 110 communicates with the bypass hole.

In FIG. 2, a limit flange 120 is formed on an inner side surface of the accommodating hole 100, and the limit flange 120 and an inner side surface of the accommodating hole 100 above the limit flange 120 cooperatively form a first recess, and the limit flange 120 and an inner side surface of the accommodating hole 100 below the limit flange 120 cooperatively form a second recess; and the bottle cap comprises a flow path switching element 12 which is rotatably arranged in the first recess and supported on the top of the limit flange 120. Thus, the position of the flow path switching element 12 can be limited by the limit flange 120. Besides, the limit flange 120 may be or not be integral with the case 10.

In FIG. 2, a protruding body 13 is arranged on the bottom of the limit flange 120, and a first through-hole 121 is formed in the limit flange 120 and the protruding body 13; and a plug 17 is movably arranged in the first through-hole 121. Besides, a limit portion 16 is mounted on the bottom of the protruding body 13, which is configured for restricting the plug to the first through-hole. Thus, the plug 17 can be in the first through-hole 121 all the time. In the present embodiment, the protruding body 13 is integral with the limit flange 120.

Furthermore, a second through-hole 122 is defined in the limit flange 120. Thus, the first recess and the second recess can be connected via any one of the first through-hole 121 and a second through-hole 122.

An internal thread 14 is formed on an inner side surface of the second recess, which is configured for fixing a bottle (not shown) with an external thread corresponding to the internal thread 14, and the bottle is configured for accommodating tire puncture sealant. It can be understood that the bottle can be mounted in the second recess via a gluing connection mode, and so on. Advantageously, when the bottle accommodating tire puncture sealant is fixed in the second recess, the protruding body 13 reaches the bottom of the bottle. Thus, when compressed air is fed into the bottle, the tire puncture sealant will enter into the protruding body 13 at once.

In FIG. 2, an outlet pipe 15 is arranged on an external side surface of the case 10; and the outlet pipe 15 communicates with the first through-hole 121.

Furthermore, an arc-shaped first flow path 123 is defined in the flow path switching element 12, and the first flow path 123 communicates with the first inner hole 110 of the inlet pipe 11; and a second flow path 124 is axially defined in the flow path switching element 12, communicates with the first flow path 123. Besides, the second flow path 124 optionally communicates with the first through-hole 121 or the second through-hole 122 via rotation of the flow path switching element 12.

Advantageously, a ring flange 125 is formed on an external surface of the flow path switching element 12. Thus, when the flow path switching element 12 is arranged in the first recess, the ring flange 125 is supported on the top of the case 10 to seal a gap between the flow path switching element 12 and the case 10.

Two usage modes are implemented via the aforementioned bottle cap.

As shown in FIG. 3, FIG. 3 is a schematic view of one usage mode, i.e., tire inflation mode of the bottle cap shown in FIG. 1.

In FIG. 3, the arrows show a flowing direction of the compressed air, and the second flow path 124 communicates with the first through-hole 121. Thus, the inlet pipe 11 can communicates with the outlet pipe 15 via the first flow path 123, the second flow path 124 and the first through-hole 121; and when the outlet pipe 15 is mounted on a tire and compressed air is fed into the inlet pipe 11, the compressed air can be introduced into the tire.

As shown in FIG. 4, FIG. 4 is a schematic view of the other usage mode, i.e., sealant introduction mode of the bottle cap shown in FIG. 1.

In FIG. 4, the second flow path 124 is connected to the second through-hole 122. Thus, when the outlet pipe 15 is mounted on a punctured tire and compressed air is fed into the inlet pipe 11, the compressed air is led into the bottle accommodating tire puncture sealant via the second through-hole 122, and then drives the plug 17 to move above the connection point between outlet pipe 15 and the first through-hole 121, and drives the tire puncture sealant into the punctured tire via the first through-hole 121 and the outlet pipe 15.

INDUSTRIAL APPLICABILITY

The bottle cap is designed to be compatible with most of conventional compressors. Even if the compressor has no switching valve inside or has only one compressed air outlet, the goal of facilitating manual switching between flow paths of the compressed air toward a tire directly or a bottle containing tire puncture sealant is achievable. The bottle cap of the present application has a simple structure and good practicability.

The invention claimed is:

1. A bottle cap, comprising:
   a case, wherein an accommodating hole is axially formed in the case;
   an inlet pipe is arranged on a first external side surface of the case; and a first inner hole of the inlet pipe communicates with the accommodating hole;
   a limit flange is formed on an inner side surface of the accommodating hole, and the limit flange and the inner side surface of the accommodating hole above the limit flange cooperatively form a first recess;
   the limit flange and the inner side surface of the accommodating hole below the limit flange cooperatively form a second recess which is configured for fixing a bottle accommodating tire puncture sealant; and
   the bottle cap further comprises a flow path switching element which is rotatably arranged in the first recess;
   a protruding body is arranged on the bottom of the limit flange, and a first through-hole is formed in the limit flange and the protruding body;
   a plug is movably arranged in the first through-hole;
   an outlet pipe is arranged on a second external side surface of the case; and the outlet pipe communicates with the first through-hole;
   a second through-hole is defined in the limit flange;
   an arc-shaped first flow path is defined in the flow path switching element, and the first flow path communicates with the first inner hole; and
   a second flow path is defined in the flow path switching element, and communicates with the first flow path; and
   the second flow path optionally communicates with the first through-hole or the second through-hole via rotation of the flow path switching element.

2. The bottle cap according to claim 1, wherein a limit portion is mounted on the bottom of the protruding body, which is configured for restricting the plug to the first through-hole.

3. The bottle cap according to claim 2, wherein the inlet pipe is integral with the case.

4. The bottle cap according to claim 2, wherein the flow path switching element is supported on the top of the limit flange.

5. The bottle cap according to claim 2, wherein a ring flange is formed on an external surface of the flow path switching element; and when the flow path switching element is arranged in the first recess, the ring flange is supported on the top of the case to seal a gap between the flow path switching element and the case.

6. The bottle cap according to claim 1, wherein when the bottle accommodating tire puncture sealant is fixed in the second recess, the protruding body reaches the bottom of the bottle.

7. A usage method of a bottle cap, comprising steps as follows:
   providing the bottle cap, and the bottle cap includes a flow path switching element;
      an arc-shaped first flow path is defined in the flow path switching element, and communicates with an inlet pipe; and
      a second flow path is defined in the flow path switching element, and communicates with the first flow path; and
      the second flow path optionally communicates with an outlet pipe directly or a bottle accommodating tire puncture sealant via rotation of the flow path switching element;
   connecting the outlet pipe to a punctured tire; and
   rotating the flow path switching element to make the second flow path communicate with the bottle, and injecting compressed air from the inlet pipe into the outlet pipe, so that the tire puncture sealant and the compressed air are fed to the punctured tire; or
   rotating the flow path switching element to make the second flow path communicate with an outlet pipe directly, and injecting compressed air from the inlet pipe into the outlet pipe, so that only the compressed air is fed to the punctured tire.

* * * * *